United States Patent
Kim et al.

(10) Patent No.: US 9,515,563 B2
(45) Date of Patent: Dec. 6, 2016

(54) POWER MODULE AND DISTRIBUTED POWER SUPPLY APPARATUS HAVING THE SAME

(71) Applicants: SAMSUNG ELECTRO-MECHANICS CO., LTD., Suwon-si, Gyunggi-do (KR); Korea Advanced Institute of Science and Technology, Daejeon-si (KR); SOLUM CO., LTD., Gyeonggi-do, Suwon-si (KR)

(72) Inventors: Chong Eun Kim, Suwon-si (KR); Don Sik Kim, Suwon-si (KR); Jong Woo Kim, Seoul-si (KR); Duk You Kim, Seoul-si (KR); Gun Woo Moon, Daejeon-si (KR); Dong Jin Park, Suwon-si (KR)

(73) Assignees: SAMSUNG ELECTRO-MECHANICS CO., LTD., Suwon-Si (KR); KOREA ADVANCED INSTITUTE OF SCIENCE AND TECHNOLOGY, Daejeon (KR); SOLUM CO., LTD., Suwon-Si (KR)

( * ) Notice: Subject to any disclaimer, the term of this patent is extended or adjusted under 35 U.S.C. 154(b) by 366 days.

(21) Appl. No.: 13/683,736

(22) Filed: Nov. 21, 2012

(65) Prior Publication Data

US 2013/0163288 A1 Jun. 27, 2013

(30) Foreign Application Priority Data

Dec. 26, 2011 (KR) .................. 10-2011-0141947

(51) Int. Cl.
*H02M 3/335* (2006.01)
*H02M 7/23* (2006.01)
(Continued)

(52) U.S. Cl.
CPC .......... *H02M 3/33546* (2013.01); *H02M 7/23* (2013.01); *H02M 1/4225* (2013.01); *H02M 2001/0032* (2013.01); *Y02B 70/126* (2013.01); *Y02B 70/16* (2013.01)

(58) Field of Classification Search
CPC ............. H02M 7/23; H02M 3/33546; H02M 1/4225; H02M 2001/0032; H02M 3/335; Y02B 70/16; Y02B 70/126
USPC ................ 363/13, 17, 34–37, 50, 51, 65, 74
See application file for complete search history.

(56) References Cited

U.S. PATENT DOCUMENTS 5,864,110 A * 1/1999 Moriguchi ........... B23K 10/006
219/121.48
5,903,138 A * 5/1999 Hwang et al. ................ 323/266
(Continued)

FOREIGN PATENT DOCUMENTS

| CN | 1941588 A | 4/2007 |
| CN | 101465598 A | 6/2009 |

(Continued)

OTHER PUBLICATIONS

Chinese Office Action dated Oct. 8, 2014 issued in the corresponding Chinese Patent Application No. 201210298113.5.

*Primary Examiner* — Gustavo Rosario Benitez
(74) *Attorney, Agent, or Firm* — McDermott Will & Emery LLP

(57) ABSTRACT

There are a power module and a distributed power supply apparatus having the same. The power module includes: a power factor correction stage switching input power to correct a power factor thereof; a DC/DC conversion stage switching the power of which the power factor has been corrected by the power factor correction stage to convert the power into preset DC power; a control unit controlling the power factor correction stage and the DC/DC conversion stage to perform a power conversion operation in a preset powered mode and stopping the power conversion operation of the DC/DC conversion stage in a preset idle mode; and a reference voltage supply unit supplying a preset reference voltage to the DC/DC conversion stage in the idle mode.

8 Claims, 4 Drawing Sheets

(51) Int. Cl.
    *H02M 1/42*    (2007.01)
    *H02M 1/00*    (2006.01)

(56) References Cited

U.S. PATENT DOCUMENTS

| | | | |
|---|---|---|---|
| 2006/0055386 A1* | 3/2006 | Osaka | 323/282 |
| 2007/0069581 A1 | 3/2007 | Mino | |
| 2008/0157595 A1 | 7/2008 | Miyagoe | |
| 2010/0246225 A1 | 9/2010 | Moon et al. | |
| 2011/0095731 A1* | 4/2011 | Zhao | H02M 1/4225 323/205 |
| 2011/0095732 A1* | 4/2011 | Park | G05F 1/70 323/207 |
| 2011/0222318 A1 | 9/2011 | Uno et al. | |
| 2012/0236612 A1 | 9/2012 | Uno | |

FOREIGN PATENT DOCUMENTS

| | | |
|---|---|---|
| CN | 1890865 | 5/2010 |
| JP | 2005-210884 A | 8/2005 |
| JP | 2011-188632 A | 9/2011 |
| KR | 10-2010-0108902 A | 10/2010 |
| WO | 2005/057767 A1 | 6/2005 |
| WO | 2010/109694 A1 | 9/2010 |

* cited by examiner

POWER MODULE AND DISTRIBUTED POWER SUPPLY APPARATUS HAVING THE SAME

CROSS-REFERENCE TO RELATED APPLICATIONS

This application claims the priority of Korean Patent Application No. 10-2011-0141947 filed on Dec. 26, 2011, in the Korean Intellectual Property Office, the disclosure of which is incorporated herein by reference.

BACKGROUND OF THE INVENTION

1. Field of the Invention

The present invention relates to a power module capable of reducing power consumption, even with a light load applied thereto, and a distributed power supply apparatus having the same.

2. Description of the Related Art

Generally, electronic devices meeting user demands are variously implemented. The electronic devices may adopt a power supply apparatus supplying driving power so as to implement corresponding functions.

The power supply apparatus may generally adopt a switching mode power supply scheme due to advantages such as power conversion efficiency, miniaturization, or the like.

An example of the power supply apparatus may include a distributed power supply apparatus having a plurality of power modules to supply high-capacity power to electronic devices requiring high-capacity power, such as a server or the like.

FIG. 1 is a schematic configuration diagram of a general distributed power supply apparatus.

Referring to FIG. 1, a general distributed power supply apparatus 10 may include first to N-th power modules 11, 12, . . . , 1N, connected with one another in parallel (where N is a natural number of 1 or more). Among those, the first power module 11 may include an input filter 11a, a power factor correction stage 11b, a DC/DC conversion stage 11c, and a control unit 11d.

In the case that the distributed power supply apparatus 10 is out of order, only the broken power module may be replaced. In this case, since maintenance, repairs, and upgrades may be easily performed, hot swap technology of removing only the broken power module and inserting a new power module without cutting the entire power supply may be used.

Meanwhile, the above-mentioned distributed power supply apparatus 10 combines outputs of the first to N-th power modules 11, 12, . . . , 1N into one output and transfers the output to a load. As described in Patent Document 1, there is a problem in that the power module is continuously operated, even with a light load applied thereto, and as a result, power consumption is increased.

RELATED ART DOCUMENT

[Patent Document 1) Korean Patent Laid-Open Publication No. 10-2010-0108902

SUMMARY OF THE INVENTION

An aspect of the present invention provides a power module supplying a reference voltage to a DC/DC conversion stage to stop an operation of the DC/DC conversion stage when a light load is applied thereto while performing a power supplying operation during a hot swap or when a heavy load is applied thereto, and a distributed power supply apparatus having the same.

According to an aspect of the present invention, there is provided a power module, including: a power factor correction stage switching input power to correct a power factor thereof; a DC/DC conversion stage switching the power of which the power factor has been corrected by the power factor correction stage to convert the power into preset DC power; a control unit controlling the power factor correction stage and the DC/DC conversion stage to perform a power conversion operation in a preset powered mode and stopping the power conversion operation of the DC/DC conversion stage in a preset idle mode; and a reference voltage supply unit supplying a preset reference voltage to the DC/DC conversion stage in the idle mode.

The power factor correction stage may include: a power factor corrector switching the input power and adjusting a phase difference between voltage and current of the input power to correct the power factor; and a power factor correction controller controlling the switching of the power factor corrector according to the controlling of the control unit.

The DC/DC conversion stage may include: a DC/DC conversion unit switching the power of which the power factor has been corrected and converting the switched power into the DC power; and a DC conversion controller controlling the switching of the DC/DC conversion unit according to the controlling of the control unit.

The DC/DC conversion unit may track the reference voltage at the time of switching from the idle mode to the powered mode, to perform a power switching operation.

The DC conversion controller may include: a comparator comparing the reference voltage with a preset first voltage; and a first switch cutting an output of the comparator according to the controlling of the control unit in the idle mode.

The reference voltage supply unit may include a second switch transferring the reference voltage to the comparator in the idle mode and cutting the transferring of the reference voltage according to a power operation cutting control of the control unit.

The power module may further include an input filter unit rectifying AC power and filtering electromagnetic interference to supply the power to the power factor correction stage.

According to another aspect of the present invention, there is provided a distributed power supply apparatus, including: a plurality of power modules connected with one another in parallel and supplying preset power, wherein each of the plurality of power modules includes: a power factor correction stage switching input power to correct a power factor thereof; a DC/DC conversion stage switching the power of which the power factor has been corrected by the power factor correction stage to convert the power into preset DC power; a control unit controlling the power factor correction stage and the DC/DC conversion stage to perform a power conversion operation in a preset powered mode and stopping the power conversion operation of the DC/DC conversion stage in a preset idle mode; and a reference voltage supply unit supplying a preset reference voltage to the DC/DC conversion stage in the idle mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
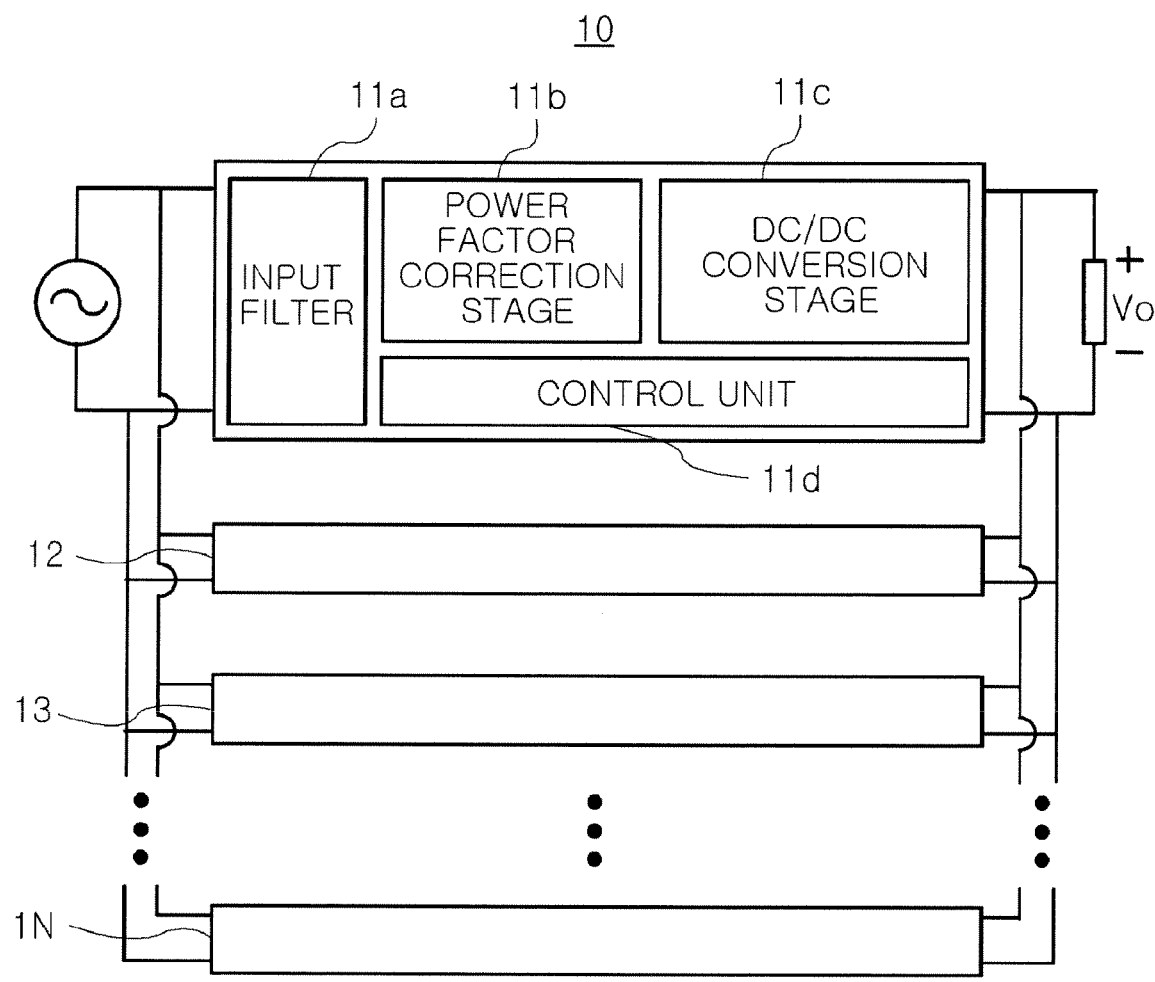
FIG. 1 is a schematic configuration diagram of a general distributed power supply apparatus.

Hereinafter, embodiments will be described in detail with reference to the accompanying drawings such that they can be easily practiced by those skilled in the art to which the present invention pertains.

However, in describing embodiments of the present invention, detailed descriptions of well-known functions or constructions will be omitted so as not to obscure the description of the present invention with unnecessary detail.

In addition, like or similar reference numerals denote parts performing similar functions and actions throughout the drawings.

A case in which any one part is connected with another part includes a case in which the parts are directly connected with each other and a case in which the parts are indirectly connected with each other with other elements interposed therebetween.

In addition, unless explicitly described otherwise, "comprising" any components will be understood to imply the inclusion of other components but not the exclusion of any other components.

Embodiments of the present invention will now be described in detail with reference to the accompanying drawings.

Figure 2:
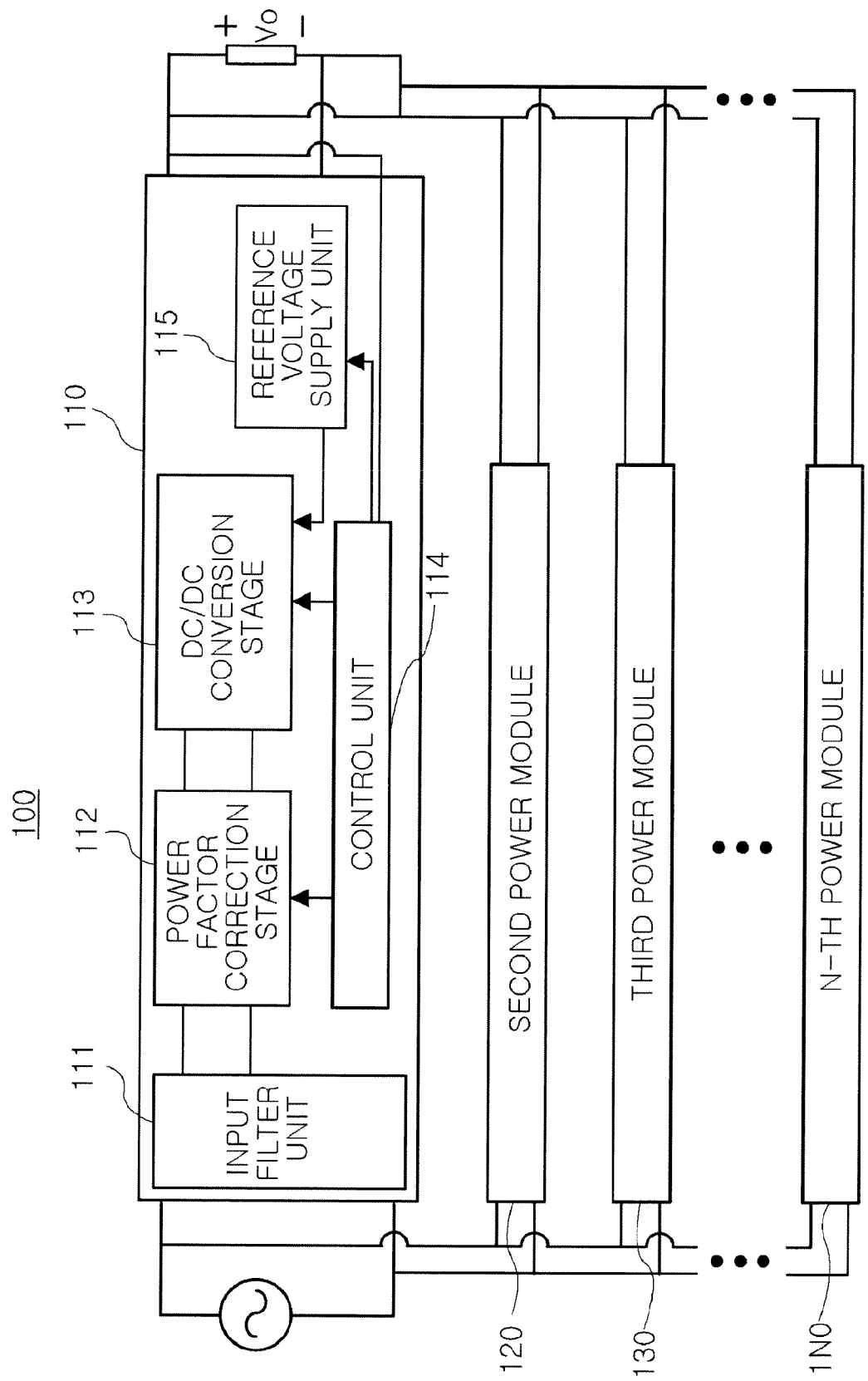
FIG. 2 is a schematic configuration diagram of a distributed power supply apparatus according to an embodiment of the present invention.
Figure 3:
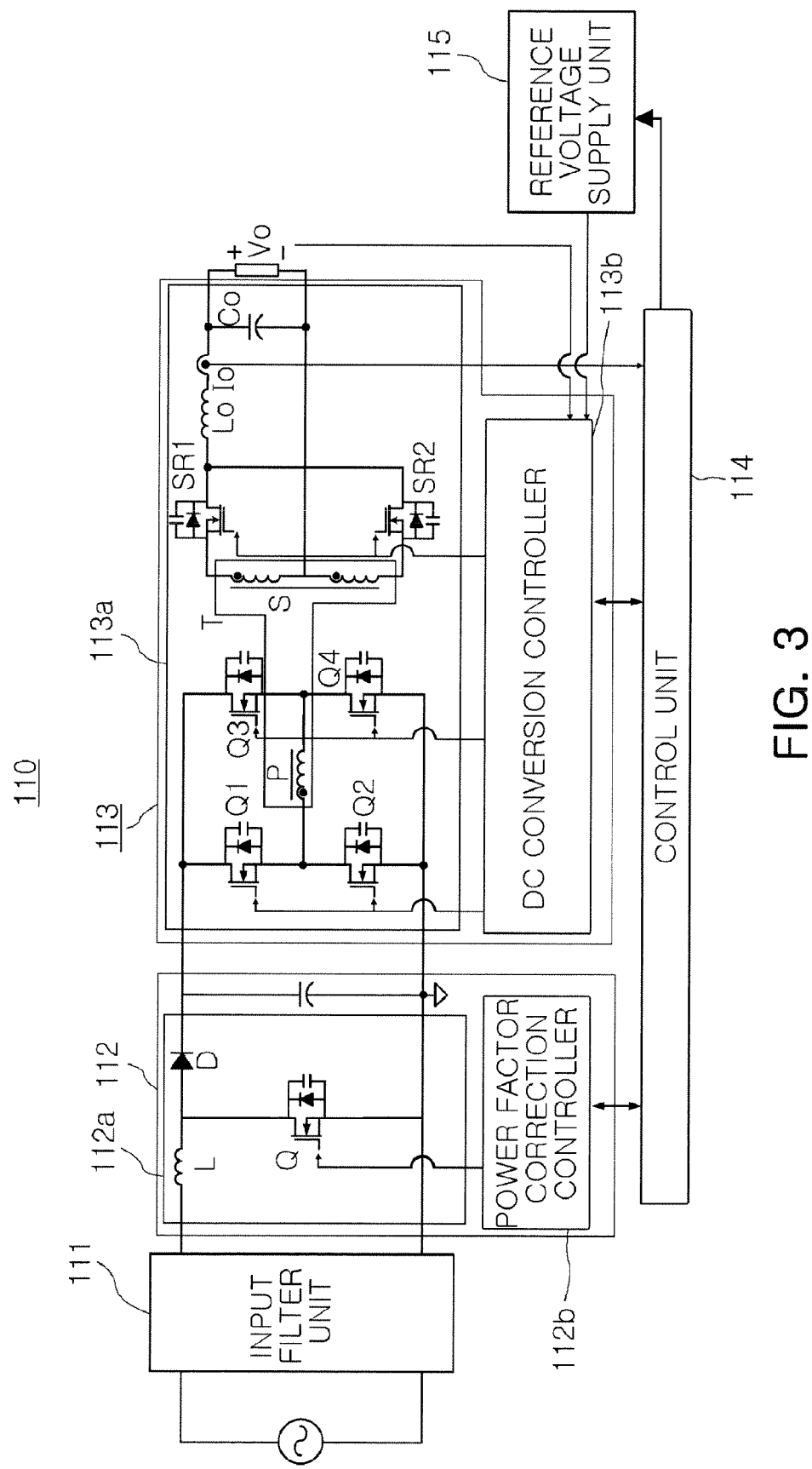
FIG. 3 is a schematic configuration diagram of a power module according to an embodiment of the present invention, adopted in the distributed power supply apparatus shown in FIG. 2.

FIG. 2 is a schematic configuration diagram of a distributed power supply apparatus, according to an embodiment of the present invention and FIG. 3 is a schematic configuration diagram of a power module according to an embodiment of the present invention, adopted in the distributed power supply apparatus shown in FIG. 2.

Referring to FIG. 2, a distributed power supply apparatus 100 according to an embodiment of the present invention may include a plurality of first to nth power modules 110, 120, 130, and 1N0.

The plurality of first to nth power modules 110, 120, 130, and 1N0 may individually output preset DC powers, and the output DC powers may be grouped as one output power to be supplied to a load.

Each of the plurality of power modules 110, 120, 130, and 1N0 may be identically configured. For example, the first power module 110 may include an input filter unit 111, a power factor correction stage 112, a DC/DC conversion stage 113, a control unit 114; and a reference voltage supply unit 115.

The input filter unit 111 may rectify and smooth input AC power and supply the rectified power to the power factor correction stage 112.

The power factor correction stage 112 may correct a phase difference between voltage and current of the rectified power from the input filter unit 111 to correct a power factor.

The DC/DC conversion stage 113 may convert DC power of which the power factor has been corrected by the power factor correction stage 112 into preset DC power and output the converted DC power.

The control unit 114 may control operations of the power factor correction stage 112 and the DC/DC conversion stage 113 according to a load state and stop the operations of the power factor correction stage 112 and the DC/DC conversion stage 113 when a user turns off a power supply. The control unit 114 may resume the operations of the power factor correction stage 112 and the DC/DC conversion stage 113 in a powered mode such as when a heavy load is applied thereto and stop only the operation of the DC/DC conversion stage 113 in an idle mode such as when a light load is applied thereto.

The reference voltage supply unit 115 may supply a preset reference voltage to the DC/DC conversion stage 113 according to the controlling of the control unit 114, to allow the DC/DC conversion stage 113 to track the reference voltage when the DC/DC conversion stage 113 resumes.

In more detail, in the case of resuming the DC/DC conversion stage 113 after the power conversion operation stops, the DC/DC conversion stage 113 may perform a soft start function in which an output voltage slowly increases while the tracked voltage is gradually adjusted upwardly. In this case, the reference voltage supply unit 115 may supply the reference voltage to the DC/DC conversion stage 113 during the idle mode in which the operation of the DC/DC conversion stage 113 stops, so as to allow the DC/DC conversion stage 113 to immediately track the reference voltage without performing the soft start operation in the hot swap or the powered mode such as a case in which a heavy load is required, thereby immediately providing the required DC power.

More detailed components of the power module will be appreciated from FIG. 3.

As described above, the first power module 110 may include the input filter unit 111, the power factor correction stage 112, the DC/DC conversion stage 113, the control unit 114, and the reference voltage supply unit 115.

The power factor correction stage 112 may include a power factor corrector 112a and a power factor correction controller 112b.

The power factor corrector 112a may include a switch Q, an inductor L, and a diode D, wherein the switch Q may switch the rectified power from the input filter unit 111, the inductor L may be charged with or discharge energy of the rectified power according to the switching of the switch Q, and the diode D may form a transfer path for the power of which the power factor has been corrected.

The power factor correction controller 112b may control the switching of the switch Q of the power factor corrector 112a and the switching control operation of the power factor correction controller 112b may be performed or stopped according to the controlling of the control unit 114.

The DC/DC conversion stage 113 may include a DC/DC converter 113a and a DC conversion controller 113b.

The DC/DC converter 113a may include a switch group including switches Q1 to Q4 (hereinafter, referred to as "a switch group Q1 to Q4"), a transformer T, and rectifying circuits SR1, SR2, Lo, and Co.

The switch group Q1 to Q4 may be configured as a half bridge or push-pull type having at least two switches or a full bridge type having four switches. For example, FIG. 3 shows a structure of the full bridge type having four switches Q1, Q2, Q3, and Q4 switching the power of which the power factor has been corrected.

The transformer T may include a primary winding P and a secondary winding S. The primary winding P may form a preset turn ratio with the secondary winding S and receive the power switched by the switch group Q1 to Q4. The secondary winding S may transform a voltage level of the power input to the primary winding P according to the turn ratio and output the transformed power. In addition, the secondary winding S may be dividedly wound to have a center tap.

The rectifying circuits SR1, SR2, Lo, and Co may include rectifying elements referred to as "SR1 and SR2", an output inductor referred to as "Lo", and an output capacitor referred to as "Co".

The rectifying elements SR1 and SR2 may be synchronized with the switching of the switch group Q1 to Q4 to rectify the output power from the secondary winding S.

The output inductor Lo and the output capacitor Co may filter and stabilize the power rectified by the rectifying elements SR1 and SR2 to output the DC power.

The DC conversion controller 113b may control the switching of the switch group Q1 to Q4. To this end, the DC conversion controller 113b may receive feedback regarding the voltage level of the DC power. Further, as described above, in the case of resuming the DC conversion controller 113b after the power conversion operation stops, the DC/DC conversion controller 113b may perform the soft start function in which an output voltage slowly increases while the tracked voltage is gradually adjusted upwardly. In this case, the reference voltage supply unit 115 may supply the reference voltage to the DC/DC conversion controller 113b during the idle mode in which the operation of the DC/DC conversion controller 113b stops according to the controlling of the control unit 114, so as to allow the DC/DC conversion controller 113b to immediately track the reference voltage without performing the soft start operation in the hot swap or the powered mode such as a case in which a heavy load is required, thereby immediately providing the required DC power.

The control unit 114 may receive feedback regarding a current level of the DC power and may control the operation of the reference voltage supply unit 115.

Figure 4:
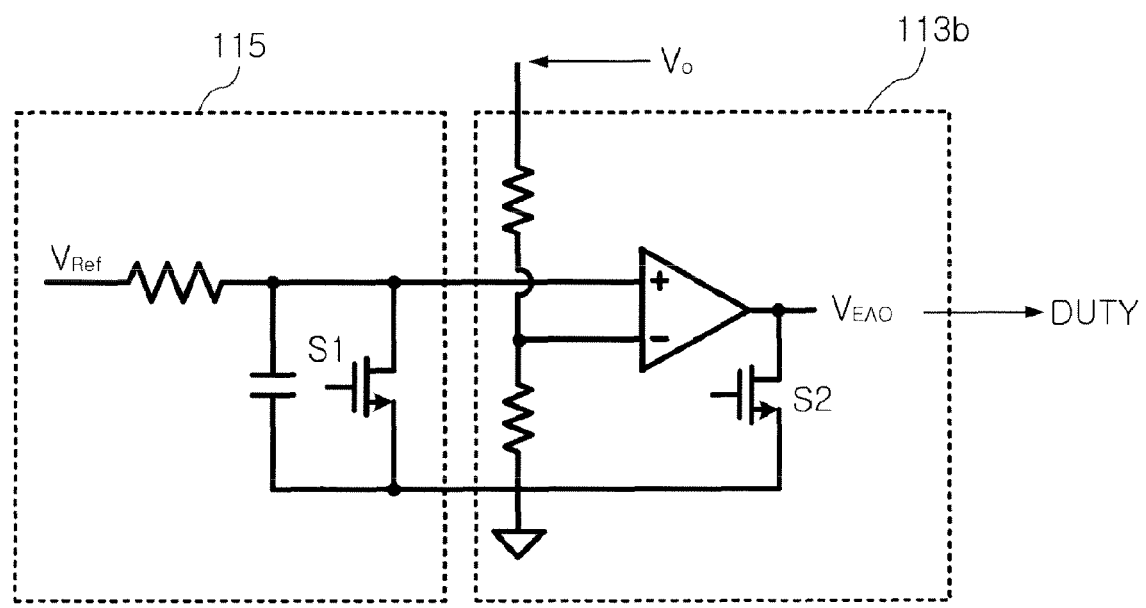
FIG. 4 is a schematic configuration diagram of a reference voltage supply unit and a DC conversion controller, which are adopted in the power module shown in FIG. 3.

FIG. 4 is a schematic configuration diagram of a reference voltage supply unit and a DC conversion controller, which are adopted in the power module shown in FIG. 3.

Referring to FIG. 4, the DC conversion controller 113b may include a comparator and a switch S1, wherein the comparator may include an inverting terminal (−) receiving a voltage level Vo of the DC power and a non-inverting terminal (+) receiving a reference voltage Vref. The comparator may provide a compared result Vero to an internal circuit of the DC conversion controller 113b to control a switching duty of the switching group Q1 to Q4.

The switch S1 may be turned-off, according to the controlling of the control unit 114, in the powered mode to thereby control the switching duty of the switch group Q1 to Q4 and may be turned-on in the idle mode to thereby stop controlling the switching duty of the switch group Q1 to Q4. In this case, the reference voltage supply unit 115 may continuously supply the reference voltage Vref to the non-inverting terminal (+) of the comparator even in the idle mode so as to promptly perform the controlling of the switching duty in the powered mode.

The reference voltage supply unit 115 may include a switch S2 that may be turned-on or turned-off according to the controlling of the control unit 114 to output or cut the reference voltage Vref. The switch S2 may be turned-off according to the controlling of the control unit 114 even in the idle mode to supply the reference voltage Vref to the non-inverting terminal (+) of the comparator.

As set forth above, according to the embodiments of the present invention, the reference voltage may be supplied to the DC/DC conversion stage so as to halt the operation of the DC/DC conversion stage when a light load is applied thereto while performing the power supplying operation during a hot swap or when a heavy load is applied, whereby power consumption may be reduced even in a light load condition, and a desired power supply may be promptly performed in hot swap or heavy load conditions.

While the present invention has been shown and described in connection with the embodiments, it will be apparent to those skilled in the art that modifications and variations can be made without departing from the spirit and scope of the invention as defined by the appended claims.

What is claimed is:

1. A power module, comprising:
   a power factor correction stage configured to switch an input power to correct a power factor thereof;
   a DC/DC conversion stage configured to convert a power output of the power factor correction stage into a DC power;
   a control unit configured to control the power factor correction stage and the DC/DC conversion stage to perform a power conversion operation in a preset powered mode and to stop the power conversion operation of the DC/DC conversion stage in a preset idle mode; and
   a reference voltage supply unit configured to supply a reference voltage to the DC/DC conversion stage in the preset idle mode, wherein the control unit is further configured to receive a current feedback associated with a current level of the DC power and to control an operation of the reference voltage supply unit, and
   wherein the DC/DC conversion stage is further configured to track the reference voltage supplied in the preset idle mode, at the time of switching from the preset idle mode to the preset powered mode, to perform a power switching operation; and
   wherein the DC/DC conversion stage includes:
   a DC/DC conversion unit configured to switch the power output of the power factor correction stage and to convert the switched power into the DC power; and
   a DC conversion controller configured to control the switching of the DC/DC conversion unit based on a control exerted by the control unit; and wherein the DC conversion controller includes:
   a comparator configured to compare the reference voltage with a first voltage set by a voltage level of the DC power; and
   a first switch configured to cut an output of the comparator according to the controlling of the control unit in the idle mode.

2. The power module of claim 1, wherein the power factor correction stage includes:
   a power factor corrector configured to switch the input power and to adjust a phase difference between a voltage and a current of the input power to correct the power factor; and
   a power factor correction controller configured to control the switching of the power factor corrector based on a control exerted by the control unit.

3. The power module of claim 1, wherein the reference voltage supply unit includes a second switch configured to transfer the reference voltage to the comparator in the preset idle mode and to cut the transferring of the reference voltage according to a power operation cutting control of the control unit.

4. The power module of claim 1, further comprising an input filter unit configured to rectify AC power and to filter electromagnetic interference to supply the power to the power factor correction stage.

5. A distributed power supply apparatus, comprising:
a plurality of power modules connected with one another in parallel and configured to supply a preset power, wherein each of the plurality of power modules includes:
a power factor correction stage configured to switch input power to correct a power factor thereof;
a DC/DC conversion stage configured to switch a power output of the power factor correction stage to convert the power output into a DC power;
a control unit configured to control the power factor correction stage and the DC/DC conversion stage to perform a power conversion operation in a preset powered mode and to stop the power conversion operation of the DC/DC conversion stage in a preset idle mode; and
a reference voltage supply unit configured to supply a reference voltage to the DC/DC conversion stage in the preset idle mode,
wherein the control unit is further configured to receive a current feedback associated with a current level of the DC power and to control an operation of the reference voltage supply unit, and wherein the DC/DC conversion stage is further configured to track the reference voltage supplied in the preset idle mode, at the time of switching from the preset idle mode to the preset powered mode, to perform a power switching operation; and wherein the DC/DC conversion stage includes:
a DC/DC conversion unit configured to switch a power output of the power factor correction stage and to convert the switched power into a DC power; and
a DC conversion controller configured to control the switching of the DC/DC conversion unit based on a control exerted by the control unit; and wherein the DC conversion controller includes:
a comparator configured to compare the reference voltage with a first voltage set by a voltage level of the DC power; and
a first switch configured to cut an output of the comparator based on a control exerted by the control unit in the preset idle mode.

6. The distributed power supply apparatus of claim 5, wherein the power factor correction stage includes:
a power factor corrector configured to switch the input power and to adjust a phase difference between a voltage and a current of the input power to correct the power factor; and
a power factor correction controller configured to control the switching of the power factor corrector based on a control exerted by the control unit.

7. The distributed power supply apparatus of claim 5, wherein the reference voltage supply unit includes a second switch configured to transfer the reference voltage to the comparator in the preset idle mode and to cut the transferring of the reference voltage according to a power operation cutting control of the control unit.

8. The distributed power supply apparatus of claim 5, wherein each of the plurality of power modules further includes an input filter unit configured to rectify AC power and to filter electromagnetic interference to supply the power to the power factor correction stage.

* * * * *